No. 685,723. Patented Oct. 29, 1901.
T. C. MENGES.
FRICTION CLUTCH.
(Application filed May 20, 1901.)
(No Model.)

Witnesses:

Inventor:
Theodore C. Menges,
By Peirce & Fisher,
his Attorneys.

THE NORRIS PETERS CO., PHOTO-LITHO., WASHINGTON, D. C.

UNITED STATES PATENT OFFICE.

THEODORE C. MENGES, OF WATERLOO, IOWA, ASSIGNOR TO DAVIS GASOLINE ENGINE WORKS COMPANY, OF WATERLOO, IOWA, A CORPORATION.

FRICTION-CLUTCH.

SPECIFICATION forming part of Letters Patent No. 685,723, dated October 29, 1901.

Application filed May 20, 1901. Serial No. 61,045. (No model.)

*To all whom it may concern:*

Be it known that I, THEODORE C. MENGES, a citizen of the United States, and a resident of Waterloo, county of Blackhawk, and State of Iowa, have invented certain new and useful Improvements in Friction-Clutches, of which the following is a full, clear, and exact description.

The invention relates to improvements in friction-clutches, and seeks to provide a simple and effective construction by which the clutch members may be positively engaged and disengaged, either at rest or while in motion.

The invention consists in the features of construction hereinafter described, illustrated in the accompanying drawings, and more particularly pointed out in the appended claims.

Figure 2:
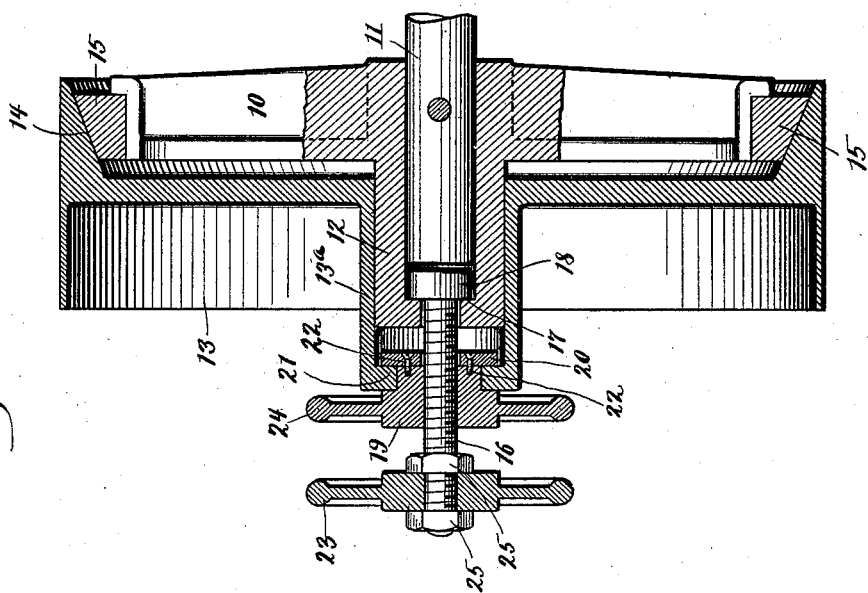
Figure 1:
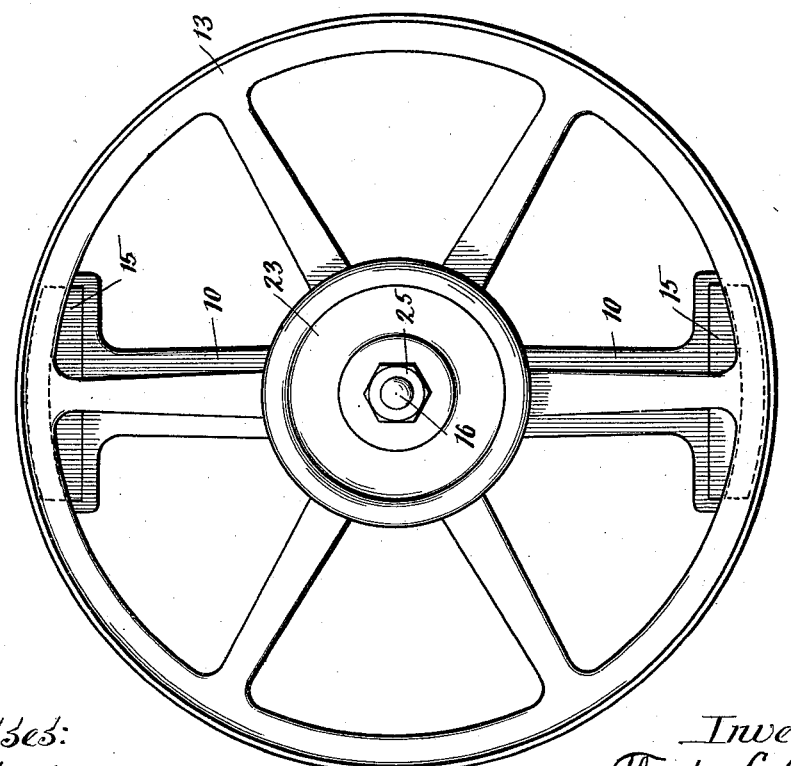

In the drawings, Figure 1 is an end elevation of the preferred form of my improved friction-clutch. Fig. 2 is a transverse sectional view of the same.

A clutch member 10, comprising a hub and oppositely-disposed extending arms, is pinned or otherwise fixed to the shaft 11 and is preferably provided with a laterally-extending hub 12, which projects beyond the end of the shaft 11, as clearly indicated in Fig. 2. Mounted to revolve upon the laterally-extending hub 12 is a pulley 13, the hub of which extends beyond the hub 12, as shown in Fig. 2. The pulley 13 forms the second clutch member and is provided with a friction-surface 14, preferably conical in outline, and friction-shoes 15, of wood or other suitable material, arranged to engage the friction-surface 14, are secured in suitable seats formed upon the ends of the oppositely-extending arms of the clutch member 10. A screw 16 is mounted in axial alinement with the shaft 11 and extends through an opening formed by a reduced or shouldered portion 17 of the bore of the hub 12. The inner end of the screw is provided with a head 18 intermediate the end of the shaft 11 and the shouldered portion 17, so that the screw will be positively held in both directions, or, in other words, the screw has a two-way engagement with the clutch member 10. The shoulder 17 is, however, spaced a sufficient distance from the end of the shaft 11 to provide the necessary play for engaging and disengaging the clutch members without binding. A nut 19 is threaded upon the screw 16 and is swiveled to the end of the hub 13ª of the pulley 13. The inner end of the nut 19 is shouldered and extends through an opening formed by a reduced or shouldered portion 21 of the bore of the hub 13ª and is held in such position by a washer or collar 20, secured to the end of the nut by means of screws 22. By such a construction the nut 19 has a two-way engagement with the pulley 13—that is to say, the pulley 13 will be positively operated in both directions by the operation of the nut.

The screw 16 and the nut 19 are provided with hand-wheels 23 and 24, in position to be readily grasped by the operator while the parts are in motion. The hand-wheel 24 is preferably cast or formed in one piece with the nut 19, and the hand-wheel 23 is preferably threaded upon the end of the screw 16 and rigidly fixed thereon by means of lock-nuts 25. The screw 16 is threaded in the direction opposite to that of the rotation of the shaft, and when it is desired to bring the loose pulley 13 into engagement with the fixed clutch member 10 the operator will hold the screw 16 stationary and rotate the nut 19 in the direction opposite to the rotation of the shaft, whereby the pulley will be positively moved slightly toward the right until such engagement is effected, when the parts will revolve together. When it is desired to disengage the loose pulley, it is only necessary to grasp the hand-wheel 23 firmly, thus holding the screw 16 stationary. The pulley 13 and nut 19 will continue to revolve and the screw 16 will be moved slightly toward the right until the head 18 engages the end of the shaft 11, when the pulley 13 will be positively moved slightly toward the left, disengaging it from the clutch member 10. Friction-clutches somewhat similar in operation have been previously devised, in which the nut engaged with and positively operated the loose pulley in one direction only. Such previous constructions have been found defective, inasmuch as the members of the clutch are frequently still held in engagement even after the nut is released. This is particularly the case with a clutch in which the friction-surfaces are conical in outline. With my improved construction, however, in which the nut 19 has a two-way engagement with the pulley or clutch member 13, the operation is positive both when the members are being engaged and when they are being disengaged.

It is obvious that numerous changes can be made in the details of the construction by the skilled mechanic without departure from the essentials of the invention.

Having thus described my invention, what I claim as new, and desire to secure by Letters Patent, is—

1. The combination with a rotatable shaft and with tight and loose clutch members thereon, of a screw and a nut threaded on said screw, said screw being in two-way engagement with one of said clutch members but rotatable independently thereof and said nut being similarly connected to the other of said clutch members, whereby said clutch members may be positively brought into and out of engagement.

2. The combination with a rotatable shaft and with fixed and loose clutch members thereon, of a screw mounted in axial alinement with said shaft and a nut threaded on said screw, each provided with operating-wheels and having a swiveled connection with the respective clutch members, whereby the loose clutch member may be positively operated in both directions.

3. The combination with a rotatable shaft and with fixed and loose clutch members thereon, of a screw mounted in axial alinement with said shaft and having a head by which it is swiveled to one of said clutch members and a shouldered nut threaded on said screw having a collar secured thereto by which it is swiveled to the other of said clutch members.

4. The combination with a rotatable shaft, of a clutch member fixed thereon having friction-shoes and a laterally-extending hub, a pulley loosely mounted on said hub having a friction-surface with which said shoes are arranged to engage, a screw swiveled to the hub of said clutch member and a nut threaded on said screw and swiveled to the hub of said pulley, substantially as described.

5. The combination with a rotatable shaft, of a clutch member fixed thereon having friction-shoes and a laterally-extending hub, a pulley loosely mounted on said hub having a conical friction-surface with which said shoes are arranged to engage, a screw swiveled to the hub of said clutch member, a nut threaded on said screw and swiveled to the hub of said pulley and operating hand-wheels connected to said screw and nut, substantially as described.

THEODORE C. MENGES.

Witnesses:
   IRA J. HOOVER,
   F. L. MARQUIS,
   FREDERICK B. BALLOU.